Patented May 16, 1950

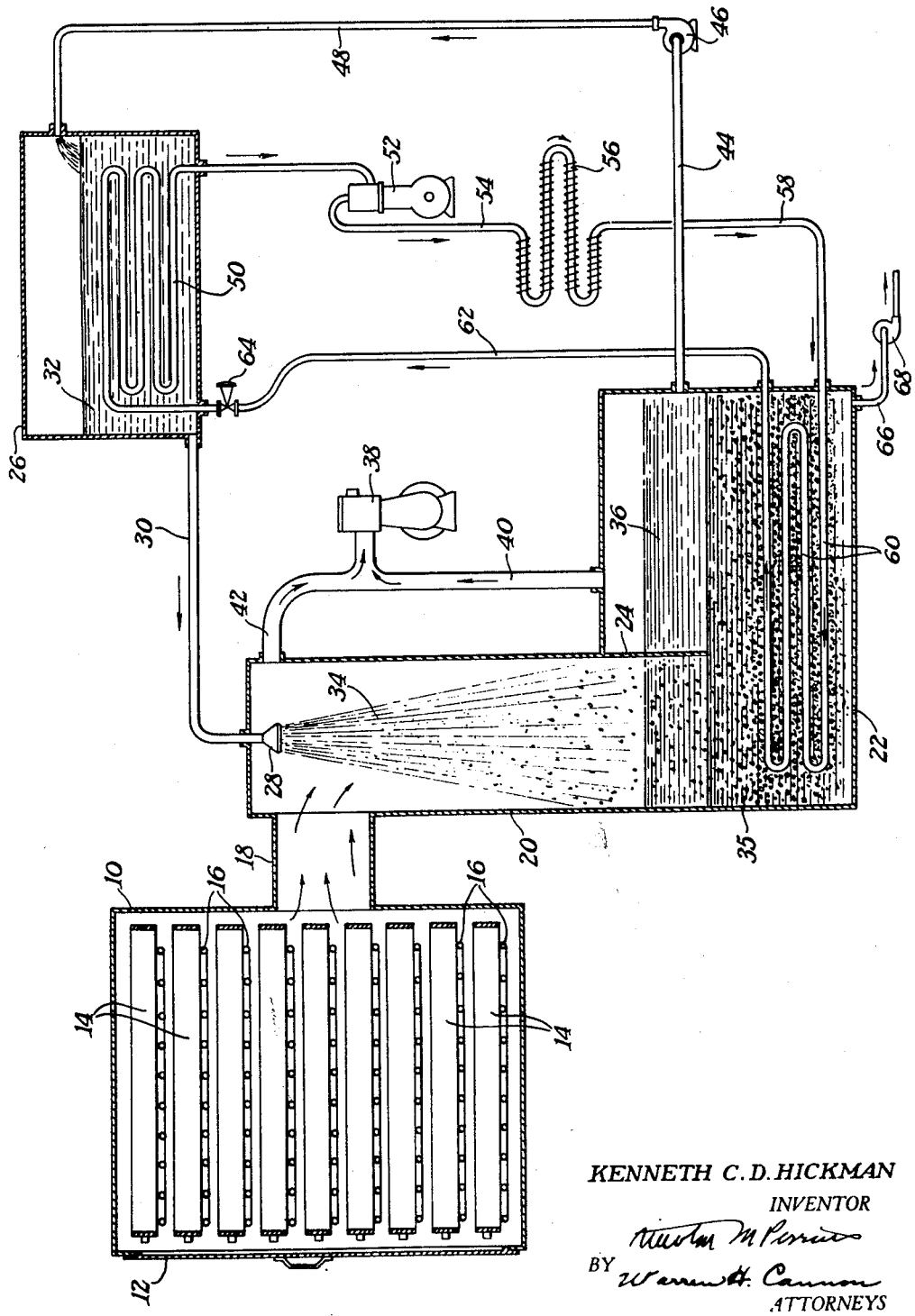

2,507,632

UNITED STATES PATENT OFFICE 2,507,632

PROCESS FOR DEHYDRATING MATERIALS UNDER LOW-PRESSURE CONDITIONS

Kenneth C. D. Hickman, Rochester, N. Y., assignor, by mesne assignments, to Eastman Kodak Company, Rochester, N. Y., a corporation of New Jersey Application November 30, 1944, Serial No. 565,920

3 Claims. (Cl. 34—5)

This invention relates to improvements in vacuum dehydration process and apparatus and, in particular, to such improvements for dehydrating in the frozen state.

It has been previously known to dehydrate materials by subjecting them to reduced pressure and to remove the evolved water vapors by various means, such as adsorption, condensation on cold condensing surfaces, etc. A similar procedure has been used for dehydrating in the frozen state. Such dehydration involves utilization of pressures below the vapor pressure of ice, i. e., 3 mm. at 0° C. In order to condense water vapor at such low pressure very low condensing temperatures are necessary. The water vapor is, of course, condensed as ice and accumulates on the condensing surface. The layer of ice reduces the efficiency of the condenser and must be removed intermittently or continuously, an operation which presents many mechanical difficulties. Continuous removal of the ice is also necessary to keep the size of the apparatus within reasonable limits. The use of adsorbing agents has also involved difficulties, such as regeneration problems.

This invention has for its object to provide improved procedure and apparatus for condensation of evolved water vapor in vacuum dehydration operations. Another object is to provide improved vacuum dehydration apparatus. A further object is to provide improved procedure and apparatus for condensing water vapor evolved during dehydration, particularly in the frozen state. A still further object is to improve the state of the art. Other objects will appear hereinafter.

These and other objects are accomplished by my invention, which includes vacuum dehydration process and apparatus wherein the material to be dehydrated is subjected to reduced pressure and the water vapor evolved therefrom is condensed on a cool liquid immiscible with liquid water, the water which is condensed on the cool immiscible liquid, being separated therefrom by stratification, and the immiscible liquid being reused in the process. In the case of vacuum dehydration in the frozen state, the immiscible liquid would also be immiscible with ice, since the water vapor would be condensed in the form of ice thereon. The immiscible liquid would then be recovered from the ice or from the water formed by melting the ice.

In the following examples and descriptions I have set forth several of the preferred embodiments of my invention but it is to be understood that these are given by way of illustration and not in limitation thereof.

Referring to the drawing wherein is shown a sectional elevation of my improved apparatus, numeral 10 designates a rectangular dehydration chamber provided with a gas-tight cover 12 and in which is positioned a plurality of trays 14 containing the material to be dehydrated. Numeral 16 designates a plurality of heating coils upon which the dehydration trays rest. Numeral 18 designates a conduit connected to a cylindrical condensing chamber 20. Number 22 designates a cylindrical reservoir to which condensing chamber 20 is connected and which is provided with an approximately semi-circular partition 24, separating the reservoir into two sections, one being that immediately below condensing cylinder 20 and the other representing the balance of the reservoir.

Numeral 26 designates another cylindrical reservoir which is connected to a spray nozzle 28 positioned in the upper part of condensing chamber 20 by conduit 30. Numeral 32 indicates a body of immiscible liquid which passes through conduit 30 and spray nozzle 28 to form a spray 34 in condensing chamber 20. Numeral 35 designates a body of water and ice crystals in the lower portion of reservoir 22, while numeral 36 designates a body of immiscible liquid in the upper portion of this reservoir. Numeral 38 designates an evacuating pump connected to reservoir 22 by conduit 40 and to dehydration chamber 20 by conduit 42. This pump maintains the dehydrating chamber 10, the condensing chamber 20 and the reservoir 22 under a suitable low pressure. Numeral 44 indicates a conduit connected to the intake side of pump 46 and number 48 a conduit connected to the exhaust side of pump 46 and discharging into reservoir 26.

Numeral 50 designates a conduit positioned inside reservoir 26 so that it is immersed in immiscible liquid 32. This conduit is a cooling conduit which is cooled to a suitable temperature by expansion of a compressed gas. Thus, numeral 52 designates a compressor of a refrigerating system, the exhaust side of which is connected by conduit 54 to a partial heat radiator 56 which is connected by conduit 58 to a complete heat radiating coil 60 which, in turn, is connected by conduit 62 to expansion valve 64.

In operating the apparatus illustrated in the drawing the material to be dehydrated is put into trays 14. Pump 38 is put into operation to evacuate the system to a suitable low degree. In the event that dehydration in the frozen state is to be carried out, a pressure below 3 mm. must be produced and maintained by pump 38 and the material in the trays can be frozen by the low pressure or be frozen prior to introduction into the trays. Refrigerating coil 50 is put into operation by starting pump 52 and pump 46 is operated to cause immiscible liquid to flow into reservoir 26 and thence through spray nozzle 28. This liquid is cooled by the refrigerating coil 50 to a suitable low temperature. Water vapors passing from dehydration chamber 10 through conduit 18 come into contact with the cold spray 34 and are condensed thereon. The spray of condensed water and immiscible liquid fall into the reservoir 22 where stratification takes place. Where the immiscible liquid is lighter than ice and water it separates as the upper layer 36 and is continuously withdrawn by pump 46, cooled and reused in the dehydration cycle. The lower layer in reservoir 22 is composed of water and ice and is continuously withdrawn from the system through conduit 66 by pump 68. When dehydrating in the frozen state the spray 34 would be a mixture of ice or frost and immiscible liquid. The frost will accumulate in the lower layer and will be warmed by coil 60 sufficiently to melt it so that it can be withdrawn through pump 68. Other means of removing the water, either in the liquid or frozen state, will be readily apparent.

The refrigerating system operates with a minimum expenditure of energy due to the fact that the heat resulting from the complete cycle is partially utilized in the process by coil 60. The amount of heat radiated in partial radiating coil 56 can be suitably adjusted so the maximum amount of energy is effectively utilized in the dehydration cycle. The compressed refrigerant, after passing through heat loss coils 56 and 60, expands through valve 64 into refrigerating coil 58, cooling the immiscible liquid 32 to a satisfactory low temperature. The expanded refrigerant then passes to the intake side of pump 52.

The immiscible liquid must have a relatively low vapor pressure at the temperature at which it is used. The vapor pressure of the liquid will, of course, depend upon the pressure utilized during the vacuum dehydration. For relatively high pressures in the dehydration system somewhat higher vapor pressure immiscible liquids can be used. For dehydration in the frozen state relatively low vapor pressure immiscible liquids can be used, such as those having a vapor pressure of less than about 1.0 mm. Hg. While I prefer to utilize an immiscible liquid which has a lower specific gravity than ice or water, it is to be understood that my invention is not limited to this feature. A liquid having a higher specific gravity may be used to condense the vapor in which case the mixture of ice and cold liquid would be led through a conduit into a compartment separate from the absorbing chamber where the ice would be melted and separate as a top layer. The conduit should preferably be sealed with the immiscible liquid in order to prevent water vapor from passing backwards into the absorbing chamber. A preferred liquid is a petroleum fraction having the desired vapor pressure and density. For example, an ordinary crankcase oil of about 20 SAE would be suitable for dehydration in the frozen state. Since the liquid must be cooled to a low temperature, it is advisable to utilize one which has a low pour point and is relatively fluid at low temperatures. If desired, pour point inhibitors may be used. Examples of lighter than water liquids are the lower vapor pressure components of fuel oil, squalane, sealing oil used for mechanical vacuum pumps and SAE 10W lubricating oil. Examples of heavier than water liquids are the Arochlors and the chlor diphenyls.

Whenever pressure in terms of millimeters is referred to in the specification or claims, it is to be understood that millimeters of mercury are intended.

What I claim is:

1. A dehydration process which comprises in combination subjecting the material to be dehydrated while in a frozen state to a pressure of below 3 mm. whereby water vapor is evolved therefrom, contacting the evolved water vapor while it is still exposed to said reduced pressure with a liquid which is immiscible with water and which is at a sufficiently low temperature that the water vapor is condensed thereon in the form of ice, melting the ice, stratifying the melted ice and immiscible liquid to form an immiscible liquid layer and a water layer, continuously withdrawing the water layer from the evacuated system and re-using the immiscible liquid layer to remove water vapor evolved in the process.

2. A dehydration process which comprises in combination subjecting the material to be dehydrated while in a frozen state to a pressure of below 3 mm. whereby water vapor is evolved therefrom, contacting the evolved water vapor while it is still exposed to said reduced pressure with a liquid which is immiscible with and lighter than water and which is at a sufficiently low temperature that the water vapor is condensed thereon in the form of ice, melting the ice, stratifying the melted ice and immiscible liquid to form an immiscible liquid layer and a water layer, continuously withdrawing the water layer from the evacuated system and re-using the immiscible liquid layer to remove water vapor evolved in the process.

3. A dehydration process which comprises in combination subjecting the material to be dehydrated while in the frozen state to a pressure of below 3 mm. whereby water vapor is evolved therefrom, contacting the evolved water vapor while it is still exposed to said low pressure with a liquid which is immiscible with water and which has been cooled by expansion of a refrigerant to a sufficiently low temperature that the water vapor is condensed thereon in the form of ice, compressing the refrigerant utilized to cool the immiscible liquid, cooling the compressed refrigerant, utilizing the balance of the heat of compression to melt the ice and then circulating the cooled refrigerant and then circulating and expanding the cooled refrigerant prior to further compression, stratifying the immiscible liquid and the melted ice, continuously withdrawing the melted ice from the evacuated system and re-using the immiscible liquid to remove water vapor evolved in the process.

KENNETH C. D. HICKMAN.

REFERENCES CITED

The following references are of record in the file of this patent:

UNITED STATES PATENTS

| Number | Name | Date |
|---|---|---|
| 327,948 | Johnstone | Oct. 6, 1885 |
| 1,076,923 | Tellier | Oct. 28, 1913 |
| 1,458,403 | Glessner | June 12, 1923 |
| 1,756,992 | Quiggle | May 6, 1930 |
| 1,888,242 | Sholtes | Nov. 22, 1932 |
| 1,974,145 | Atwell | Sept. 18, 1934 |
| 2,028,340 | Lewis | Jan. 21, 1936 |
| 2,199,815 | Flosdorf | May 7, 1940 |
| 2,312,811 | Gentil | Mar. 2, 1943 |
| 2,345,548 | Flosdorf et al. | Mar. 28, 1944 |
| 2,374,232 | Pfeiffer et al. | Apr. 24, 1945 |
| 2,400,748 | Flosdorf | May 21, 1946 |
| 2,435,503 | Levinson et al. | Feb. 3, 1948 |

FOREIGN PATENTS

| Number | Country | Date |
|---|---|---|
| 352,910 | Great Britain | Aug. 13, 1931 |